Figure 1:
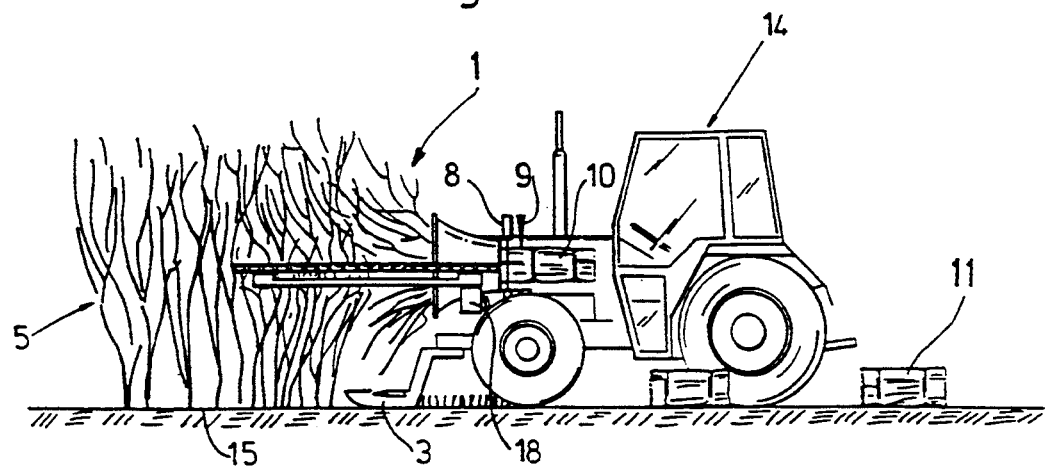

United States Patent
Wilstrand et al.

[11] Patent Number: 5,377,479
[45] Date of Patent: Jan. 3, 1995

[54] METHOD AND APPARATUS FOR HARVESTING AND BUNDLING PLANTS

[76] Inventors: Ragnar Wilstrand, Pl 601 Hamre; Mats Wilstrand, Åsgatan 96, both of S-776 00 Hedemora, Sweden

[21] Appl. No.: 90,209
[22] PCT Filed: Feb. 10, 1992
[86] PCT No.: PCT/SE92/00079
 § 371 Date: Jul. 27, 1993
 § 102(e) Date: Jul. 27, 1993
[87] PCT Pub. No.: WO92/14350
 PCT Pub. Date: Sep. 3, 1992

[30] Foreign Application Priority Data
 Feb. 15, 1991 [SE] Sweden .................. 9100462-2

[51] Int. Cl.⁶ .................. A01D 37/00; A01G 23/081; B65B 27/10
[52] U.S. Cl. .................. 56/14.3; 56/131; 100/3; 100/6; 100/7
[58] Field of Search .......... 56/14.3, 131, 140, 141, 56/DIG. 2; 100/2, 3, 5, 6, 7, 13; 144/335

[56] References Cited
U.S. PATENT DOCUMENTS

| | | | |
|---|---|---|---|
| 2,498,510 | 2/1950 | Schroeppel | 56/131 |
| 2,770,087 | 11/1956 | Hurlbut | 56/66 |
| 3,851,449 | 12/1974 | Medina | 56/14.3 |
| 4,135,350 | 1/1979 | Miyatake | 56/131 |
| 4,399,745 | 8/1983 | Jorgensen et al. | 100/2 |
| 4,562,693 | 1/1986 | Felix | 56/131 |
| 4,633,776 | 1/1987 | Blackmore et al. | 56/14.3 X |
| 4,860,808 | 8/1989 | Le Clerc De Bussy | 144/335 |

FOREIGN PATENT DOCUMENTS

| | | |
|---|---|---|
| 0040185 | 11/1981 | European Pat. Off. . |
| 1104752 | 4/1961 | Germany . |
| 71067 | 4/1929 | Sweden . |
| 103770 | 2/1942 | Sweden . |
| 429085 | 8/1983 | Sweden . |
| 336632 | 4/1959 | Switzerland . |

*Primary Examiner*—David J. Bagnell
*Attorney, Agent, or Firm*—Young & Thompson

[57] ABSTRACT

The present invention relates to a method for harvesting and bundling plants, preferably energy forest plants and the like planted in rows. The plants may be harvested from one or several planting rows by a harvesting assembly. The harvesting assembly is advanced across the ground in such a manner that the plants are continuously gripped by a feeding apparatus and are cut off. The cut-off plants are broken at a position between their ends and are folded around the position of breaking, in a direction towards the subsequent plants for forming a continuous bead of folded plants. Subsequently, the plants are conveyed by a feeding apparatus for further treatment or storing.

10 Claims, 3 Drawing Sheets

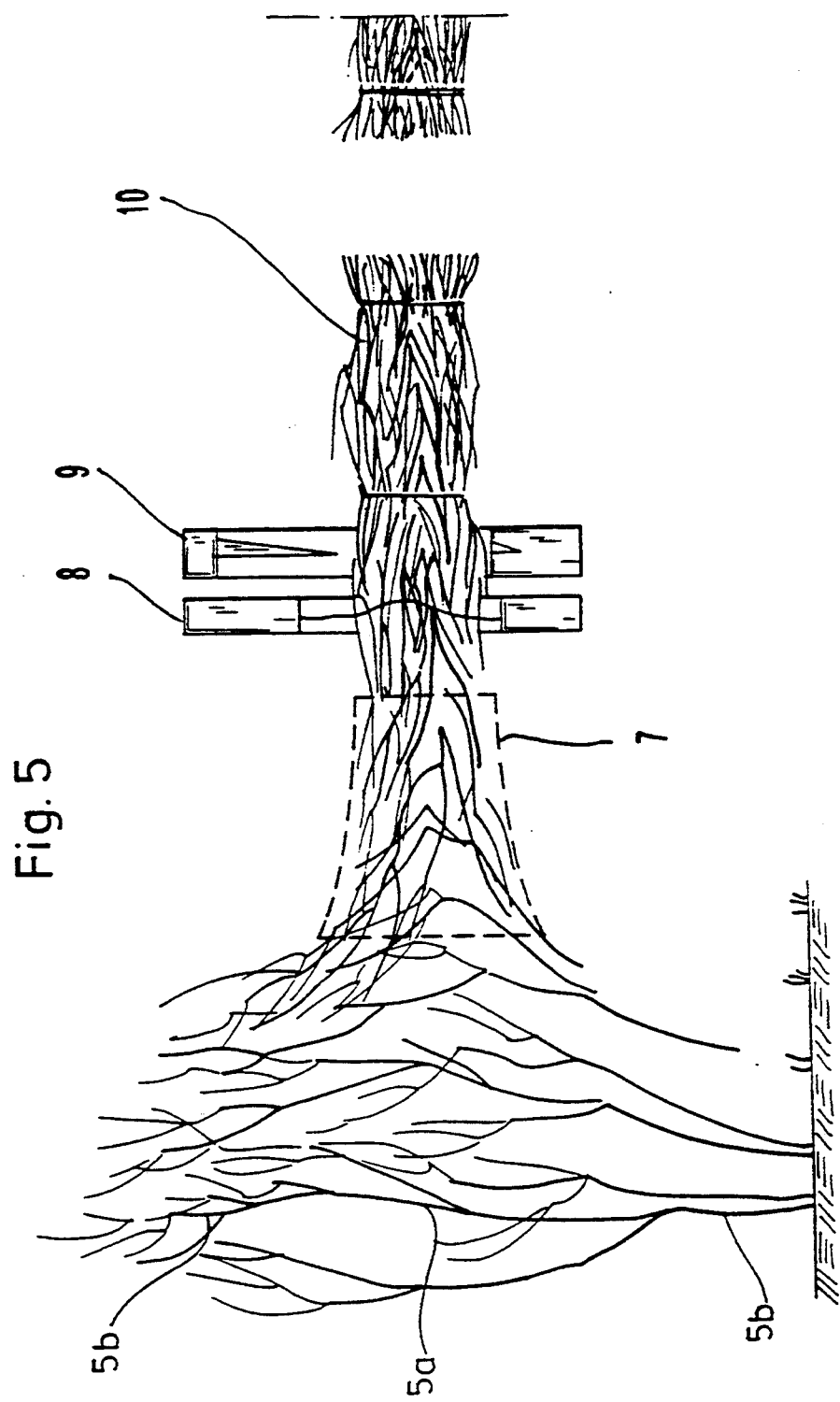

METHOD AND APPARATUS FOR HARVESTING AND BUNDLING PLANTS

The present invention generally relates to harvesting machines and more specifically relates to a method as well as an apparatus for harvesting and bundling plants, preferably energy forest plants and the like planted in rows, whereby plants from one or several planting rows, in a harvesting assembly, during advancement of the assembly on the ground, are continuously gripped by a feeding means and cut off and after the cutting are fed by the feeding means for continued treatment or storage.

Thus, the invention is primarily directed to the field of energy forest, but it should be emphasized that the invention is not restricted to this technical field and that the expression "plants" as employed herein, includes vegetation of different kinds, ranging from crops having thin stems and up to smaller trees.

For cultivations it is generally of great importance for the economy of the business to provide for rational harvesting which as far as possible lowers the costs for this phase. This is a major problem especially when cultivating energy forests, since the harvesting costs represent a large portion, presently up to 45%, of the costs per MWh. It is therefore of utmost importance to lower the harvesting costs, which make up such a large portion of the total costs, in order to compete with other energy sources.

Several attempts have been made with the purpose of rendering the harvesting work more effective, whereby for instance SE, A, 429 085 discloses a machine for harvesting and bundling plants and of the general kind indicated in the introduction, whereby the machine is provided with left and right collecting pockets for receiving plants from the respective planting row and gripping means for serving the respective collecting pocket. Although this prior art machine has been provided with an intermediate storage for each collecting pocket in order to allow for continuous cutting and collecting of plants in the machine, independent of the displacement of bundled plants from the collecting pockets to a binding apparatus by the gripping means, this results in a bulky and complex machine provided with a great number of moving parts forming potential sources of interrupted operation. For the same reason a machine of this structure becomes relatively expensive, which in turn increases the harvesting costs. Another disadvantage resides in the fact that the bundles or faggots of plants formed by means of the prior art machine are relatively irregular and therefore less suited for handling and storage. Due to the complicated and thereby expensive structure of this prior art machine and partly due to the less convenient handling and storage of the bundles, it has not been possible to obtain any actual lowering of the harvesting costs in excess of what has been indicated above, when employing this prior art machine.

Within this technical field there are also examples of other harvesting machines which to some extent correspond to what has been stated in the introduction, but which do not employ any bundling technique. One of said machines is a self-propelled machine which brings the collected and cut off plants directly to a chopping apparatus provided on the machine. A determining disadvantage of this machine is its extremely high cost price, due to the self-propelled design and due to the inclusion of the chopping apparatus, which means that this machine in most cases is not any reasonable alternative for economical reasons. Moreover, it is an essential disadvantage that the plants are directly chipped into chippings, since such chippings cannot be stored for any considerable time without being subjected to the danger of burning together and so forth.

Another prior art machine is provided with a storage space for the cut-off and collected plants, which are collected in said space in a loose condition and which are simply discharged or dumped from the machine when the space is full. Although this machine may be manufactured at a comparatively low cost it causes further problems and costs in connection with handling the loosely gathered plants. The result is that it is not possible in this case either to obtain any actual lowering of the above indicated harvesting costs.

The object of the present invention is therefore to provide a method and an apparatus of the kind indicated in the introduction, by means of which the harvesting costs may be substantially lowered and the handling and storage of the harvested plants is made more rational with the resulting further lowering of the costs.

Figure 2:
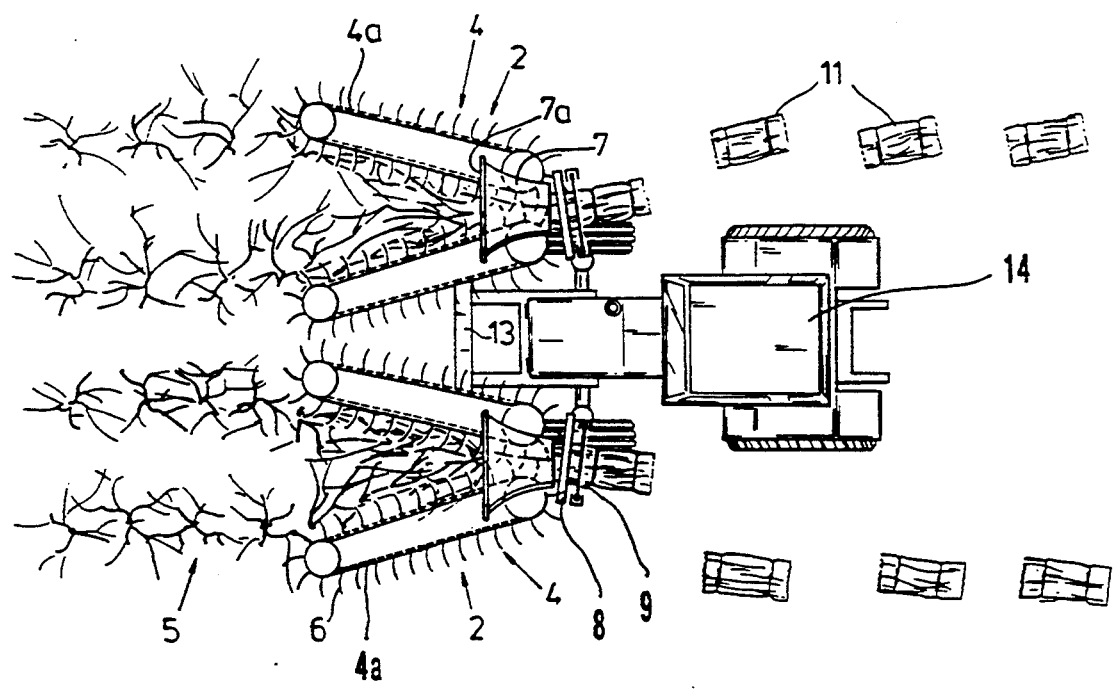
Figure 3:
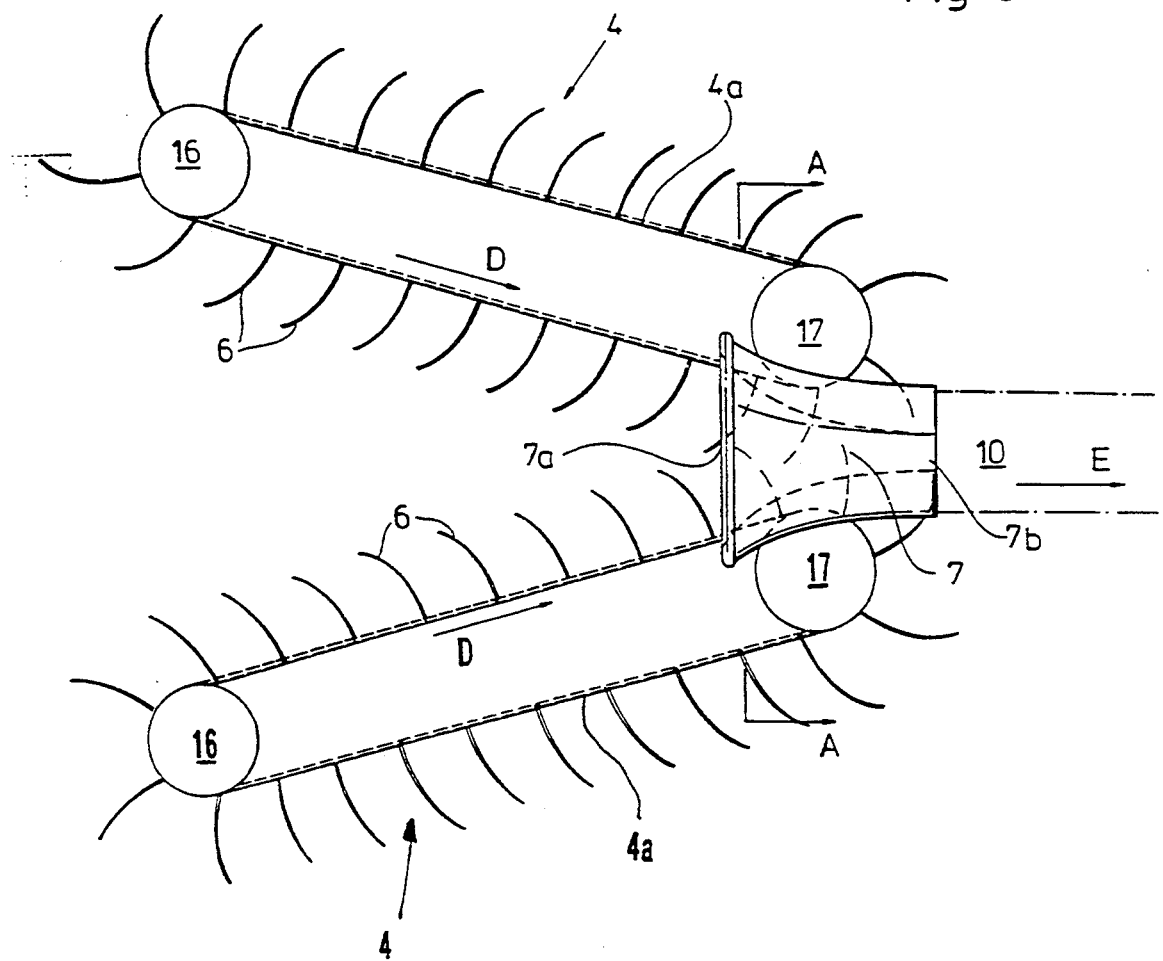
Figure 4:
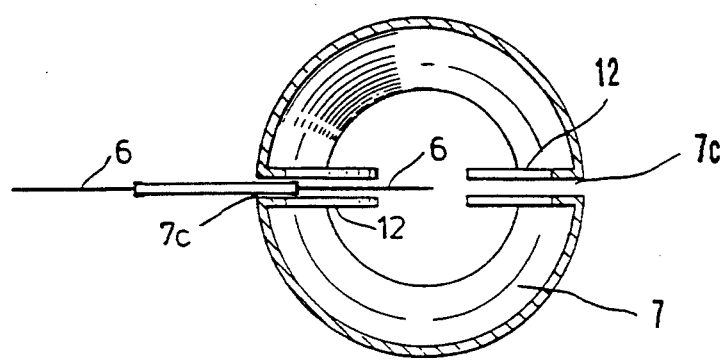

Other features and advantages of the invention are made clear in the subsequent description of an embodiment of the apparatus according to the invention, schematically illustrated on the enclosed drawings, of which:

FIG. 1 is a side view of the apparatus according to the invention fitted to a tractor, FIG. 2 is a view from above of the arrangement according to FIG. 1, FIG. 3 is a view from above, in an enlarged scale, of a harvesting assembly in the apparatus according to FIGS. 1 and 2, FIG. 4 is a section along the line A—A through the harvesting assembly of FIG. 3, and FIG. 5 is a schematical illustration in the shape of a flow chart describing the handling of the plants in accordance with the principles of the invention.

Referring first of all to FIG. 5, it shall initially be clarified that the basic idea of this invention is that the above stated objects may be achieved by the fact that, in contrast to the known method which is based on gathering the upright plants in specific bundles and then transferring these bundles to a horizontal position and then discharging the bundles, the present invention contemplates forming a continuous bead or "sausage" of the plants, which bead during the complete treatment of the plants follows substantially the same rectilinear, horizontal path, which means that no transferring or displacing movement diverging from this path has to be carried out. In accordance with the invention this is achieved by breaking the plants in a continuous sequence at a portion between their ends and by folding the plants around the point of breaking, whereby a continuous bead of folded plants is formed through the feeding movement. To our knowledge this principle is unique within this field and brings about considerable advantages due to the fact that the normal feeding means of the harvesting assembly may be employed for the breaking as well as for the feeding of the plants in the bead and also for the feeding of the formed bead itself, which means that no further feeding, gripping or transferring means what so ever will have to be employed. This greatly reduces the costs for manufacturing the apparatus and accordingly lowers the harvesting costs to a very competitive level. A further advantage achieved by employing said principle is that by cutting off the continuous bead very compact, uniform and easily handled bundles or bales are formed which are easily stored in an efficient manner.

Referring now to FIGS. 1 and 2 an embodiment of an apparatus 1 according to the invention will be described. In the illustrated embodiment the apparatus 1 consists of two harveting assemblies 2 provided side by side on a schematically indicated frame 13 which is attached to a conventional tractor 14. It is not illustrated in detail how the apparatus 1 is attached to the tractor 14, but preferably the apparatus 1 is attached in a conventional manner to the front three-point linkage of the tractor. Within the scope of the invention the apparatus 1 may naturally also be attached to other kinds of vehicles, or alternatively it may be self-propelled, although the attachment to a standard tractor obviously is preferred for reasons of cost.

Each harvesting assembly 2, the number of which may naturally be varied according to the conditions, comprises a feeding assembly 4 having two mutually counter-rotating feeding means 4a extended in a horizontal plane at a suitable height above the surface of the ground 15 for gripping plants 5 at a position between their ends. The feeding means 4a are provided at an angle relative to each other so that their forward ends are positioned at a greater distance from each other for receiving plants from one or several planting rows, while their rear ends are positioned closer together in order to guide the plants 5 towards a bead forming apparatus 7 to be described below.

One cutting unit 3 (eliminated in FIG. 2 for reasons of clarity) is provided in connection with each feeding apparatus 4. Said cutting units 3 are of a conventional kind and are provided with reciprocating saw blades or rotating saw blades for cutting off the plants close to the ground. The cutting unit 3 is no actual part of the invention and will not be described in detail. It should only be mentioned that it is preferably pivotally supported on the frame 13 and provided with skis or runners such that it may follow the contour of the ground and always cuts the plants 5 in an optimum manner.

With specific reference to FIG. 3 it is illustrated that the feeding means 4a in a suitable embodiment consist of conveyor chains guided around front and rear sprockets 16 and 17 respectively and driven in the direction illustrated by means of the arrows D in FIG. 3, by a hydraulic motor 18 indicated in FIG. 1 and preferably driven from the power take-off of the tractor rather than from the hydraulic system of the tractor. Carrier pins 6 are attached to the conveyor chains 4a at regular distances from each other and are firmly connected in a cantilever manner to the chains and are extended sideways therefrom. The carrier pins are preferably arched such that they curve rearwardly, opposite the feeding direction D towards their free outer end. The purpose of this arched form is to enable an undisturbed retraction of the carrier pins 6 from the plants 5 in the area of the rear sprocket 17 of the feeding means 4a, as will be made clearer below. At a position in front of the rear ends of the feeding means 4a stop or resistance means 7a are provided. Parts 5b of the plants at either side of a middle portion 5a thereof are intended to be brought into engagement with said stop or resistance means as the plants 5 are fed by means of the feeding means 4a. In the illustrated embodiment the resistance means 7a comprises an outer end or input end of a generally funnel-shaped bead forming or compressing means 7, from the output end 7b of which the completed bead 10 exits. Within the scope of the invention the resistance means 7a may also be provided separate from the bead forming means 7, in connection therewith. In the illustrated embodiment the actual bead forming apparatus or compressing apparatus 7 is substantially circular in cross-section, but it should be emphasized that within the scope of the invention the bead forming means 7 may be provided having practically any other cross-sectional shape for forming bales or bundles having another shape. For purposes of storage it may for instance be advantageous to employ a bead forming means 7 having a rectangular or square cross-sectional shape, in order to improve stacking or piling of the bundles.

With specific reference to FIGS. 3 and 4 it is illustrated that the bead forming apparatus 7 is provided between the two feeding means 4a of the feeding apparatus 4, in connection with the rear sprockets 17 thereof, whereby the arrangement is such that the feeding means run through slots 7c in the bead forming funnel such that the feeding means 4a in reality run through the funnel 7 in a centre plane and from opposite sides (for reasons of clarity the right side feeding means has been deleted from FIG. 4). The distance between the rear sprockets 7 of the feeding means 4a and thereby between the inner parts of the feeding means 4a is chosen such that the carrier pins 6 of the two feeding means meet in the manner illustrated in FIG. 3, which naturally requires that the feeding means are driven synchronously and that the distances between the carrier pins 6 of each feeding means, their arched shape and the mutual offset of the pitch of the carrier pins on the two feeding means must be adjusted such that the carrier pins do not come into engagement with each other during the feeding operation.

Furthermore, guide plates 12 are provided adjacent the slots 7c, the purpose of which being to guide the plants in an optimum manner from the carrier pins 6 towards the end of the direct feeding by means of the feeding means 4a. For this purpose the guide plates 12 are provided with an arcuate shape, in a plan view, at their side edge located towards the centre of the bead forming funnel 7, whereby a coordination of the arched shape of the carrier pins and of the guide plates provides for a gradual withdrawal of the carrier pins from the formed bead when their movement around the rear sprocket 17 is initiated during the final phase of their feeding, this gradual withdrawal occurring without the carrier pins catching on to any plants and thus without disturbing the continued feeding of the bead 10.

Preferably the bead forming apparatus 7 and the feeding apparatus 4 are provided displacable relative to each other in the feeding direction of the bead 10, as indicated by means of the arrow E in FIG. 3, and the purpose of this is to vary the point where the carrier pins 6 of the feeding means 4a end their direct feeding of the bead and where the bead is only indirectly advanced by the carrier pins due to the pressure from subsequent plants being fed directly by the carrier pins 6. The adjustment of this relative position between the feeding apparatus 4 and the bead forming apparatus 7 is made in order to increase or decrease the degree of compaction of the bead 10. If, in other words, the carrier pins 6 end their contact with the bead at a position at or after the output end 7b of the bead forming apparatus 7 a comparatively uncompacted bead will be formed due to the continuous active feeding directly by the carrier pins 6 until a complete bead 10 is formed; whereas a very compact bead will be formed in the case where the carrier pins end their contact with the plants a good distance before the output end 7b of the funnel 7, since the plants having been released by the carrier pins and still being present within the funnel will be clogged due to the friction against the walls of the funnel and will be further advanced only when they form a compact portion of the bead 10 up to the position where the carrier pins firmly engage the plants. In the latter case the bead 10 will therefore to a greater extent be pushed indirectly out from the funnel, whereas, in the first-mentioned case, it will be fed through the funnel directly by the feeding means 4a. This adjustability is not illustrated in the drawings but may be carried out in any optional manner obvious to a man skilled in the art.

With reference once again to FIGS. 1 and 2, a binding or strapping unit 8 is schematically illustrated, which is provided at a distance downstream of the output end 7b of the bead forming unit 7, and this binding unit 8 may be of any conventional kind being adapted to wrap a band or a string 8a around the bead 10 at regular distances in order to hold the bead together. Likewise it is schematically illustrated that a cutting means 9 is provided downstream of the binding unit 8, said cutting means 9 preferably being a hydraulic guillotine for cutting the bead into suitable lengths of bundles 11 which in the illustrated case are put down or dumped in two rows at the side of the tractor 14, one row for each assembly 2.

With reference to the above description of a schematical embodiment of the apparatus according to the invention, the method of the invention will now be described further.

As the apparatus 1 is advanced across a field plants 5 from one or several planting rows are brought in between the feeding means 4a of each harvesting assembly 2, are gradually brought together due to the angled arrangement of the feeding means 4a and are eventually gripped by the carrier pins 6 of the feeding means 4a, are cut off close to the ground by means of the cutting unit 3 and are subsequently advanced by the feeding means 4a towards the stop means 7a, i.e. in the illustrated embodiment the inlet end of the bead forming funnel 7. The carrier pins 6 acting against a midportion 5a (which may be optionally positioned between the ends of the plants and must not necessarily be positioned centrally between the ends) of the plants 5 pull the plants forcibly into the funnel 7 and break the plants through the counteraction or resistance from the stop means 7a against the portions 5b of the plants 5 at the respective side of the midportion 5a, whereby the continued feeding causes the plants 5 to be folded together with the portions 5b in the manner illustrated schematically in FIG. 5. In this phase the continuous feeding of new plants causes a compact bead of folded plants to be formed in the funnel 7, whereby the compaction or degree of packing of the bead may be controlled in the above indicated manner. As the carrier pins 6 leave the bead 10 the continued feeding of the bead is carried out indirectly through the pushing effect of the subsequent plants 5, whereby an effective packing of the bead is achieved, especially in the case where the vegetation is thin or sparse in areas and the advancement of the bead 10 therefore stops until the supply of new plants is such that the feeding thereof will overcome the friction of the bead in the funnel 7.

The above discussed guide plates 12 provide for a good safety aginst interrupted operation, since they provide for an optimum displacement of the plants out from the carrier pins 6.

After strapping the bead at regular intervals, by means of one or several bands 8a for each bundle, the bead 10 is cut into bundles 11 having a suitable length, which bundles are simply laid down at the side of the tractor 14, possibly through a discharge chute in order to securely guide the bundles 11 to a position at the side of the rear wheel of the tractor.

Although the principles of the invention have been described herein with reference to a schematically illustrated embodiment, it should be emphasized that the invention is not restricted to this illustrated and described embodiment, but that modifications, variations and additions may be carried out by men skilled in the art without diverging from the scope and basic principles of the invention. For instance it is quite conceivable, although less suitable from a question of cost, to supplement the apparatus by providing equipment for guiding the cut-off bundles directly to a trailer towed by the tractor. Thus, the scope of the invention shall only be restricted by the enclosed patent claims.

We claim:

1. Apparatus for harvesting and bundling plants, comprising at least one harvesting assembly comprising a cutting unit for cutting the plants and a feeding apparatus for conveying the plants for further treatment or storing after they have been cut off, characterized by breaking means for breaking the cut-off plants at a position between their ends, and by bead forming means for folding the plants around the position of breaking and in a direction towards subsequent plants, for forming a continuous bead of folded plants.

2. Apparatus according to claim 1, characterized in that the feeding apparatus comprises feeding means having carrier pins provided thereon for conveying the plants, the carrier pins of the feeding means being arranged for engagement with a midportion of the plants, stop means being provided in a plane which is substantially perpendicular to a bead feeding direction of the feeding apparatus and intended to engage portions of the plants at the respective side of the midportion through the conveying movement, whereby the breaking means comprises the carrier pins and the stop means which are arranged to cooperate in breaking the plants through the conveying of the midportion of the plants by means of the carrier pins and through the counteraction of the stop means against the portions of the plants adjoining the midportion thereof.

3. Apparatus according to claim 2, characterized in that the bead forming apparatus comprises a compacting unit tapering funnel-shaped in the bead feeding direction and being provided in connection with or as an extension of the stop means, the feeding apparatus acting to directly convey the broken and folded plants through at least one portion of the compacting unit, and by a strapping unit provided after the bead forming apparatus as seen in the bead feeding direction, and a cutting means provided after the strapping unit for cutting off the bead to form bundles of optional length.

4. Apparatus according to claim 3, characterized in that the feeding means and the compacting apparatus are displaceable relative to each other in the bead feeding direction of the feeding apparatus, in order to release the engagement of the carrier pins with the plants at a position being adjustable in the feeding direction in relation to an output end of the compacting apparatus, for adjusting the degree of packing of the bead.

5. Apparatus according to claim 4, characterized in that the carrier pins are cantilever attached to an endless feeding means, and have an arcuate shape with the free end thereof curved rearwardly relative to the conveying direction of the feeding means and in that in the compacting apparatus the carrier pins run between two guide plates the outer edges of which likewise have an arcuate shape, whereby the plates are adapted to guide the plants out from their engagement with the carrier pins as the latter, during the continuous feeding, are gradually retracted from the formed bead in a direction substantially perpendicular to the bead feeding direction.

6. A method for harvesting and bundling plants in a harvesting assembly during the advancement of said harvesting assembly across the ground, comprising the steps of continuously gripping plants by a feeding apparatus, cutting off said plants, breaking said plants at a position between ends of said plants, folding said plants around said position and towards subsequent plants for forming a continuous bead of folded plants, and conveying said plants for further treatment or storage.

7. A method according to claim 6 wherein said breaking and folding steps are performed by the conveying movement of the feeding apparatus intended for conveying the plants in the harvesting assembly, comprising the steps of engaging a midportion of the plants with carrier pins of the feeding apparatus, conveying the plants by the carrier pins towards a stop means, engaging those portions of the plants at respective sides of the midportion with the stop means thereby breaking the midportion of the plants, and folding the respective sides of the midportion towards each other while conveying the plants.

8. A method according to claim 7 further including the steps of compacting the bead of folded plants, strapping a band around the bead at regular intervals, and cutting the bead into bundles of optional length, the compacting step comprising the steps of conveying the bead of folded plants by means of the feeding apparatus through at least a portion of a tapering funnel-shaped bead forming device associated with the stop means.

9. A method according to claim 8 further including the step of adjusting the degree of compacting of the bead by the step of adjusting the position where the carrier pins are brought out of engagement with the bead relative to an output end of the bead forming device.

10. A method according to claim 9 wherein said adjusting step includes the step of disengaging the carrier pins from the bead by gradually releasing the carrier pins from the bead in a direction substantially parallel to the direction in which the bead is being conveyed during continued feeding.

* * * * *